UNITED STATES PATENT OFFICE.

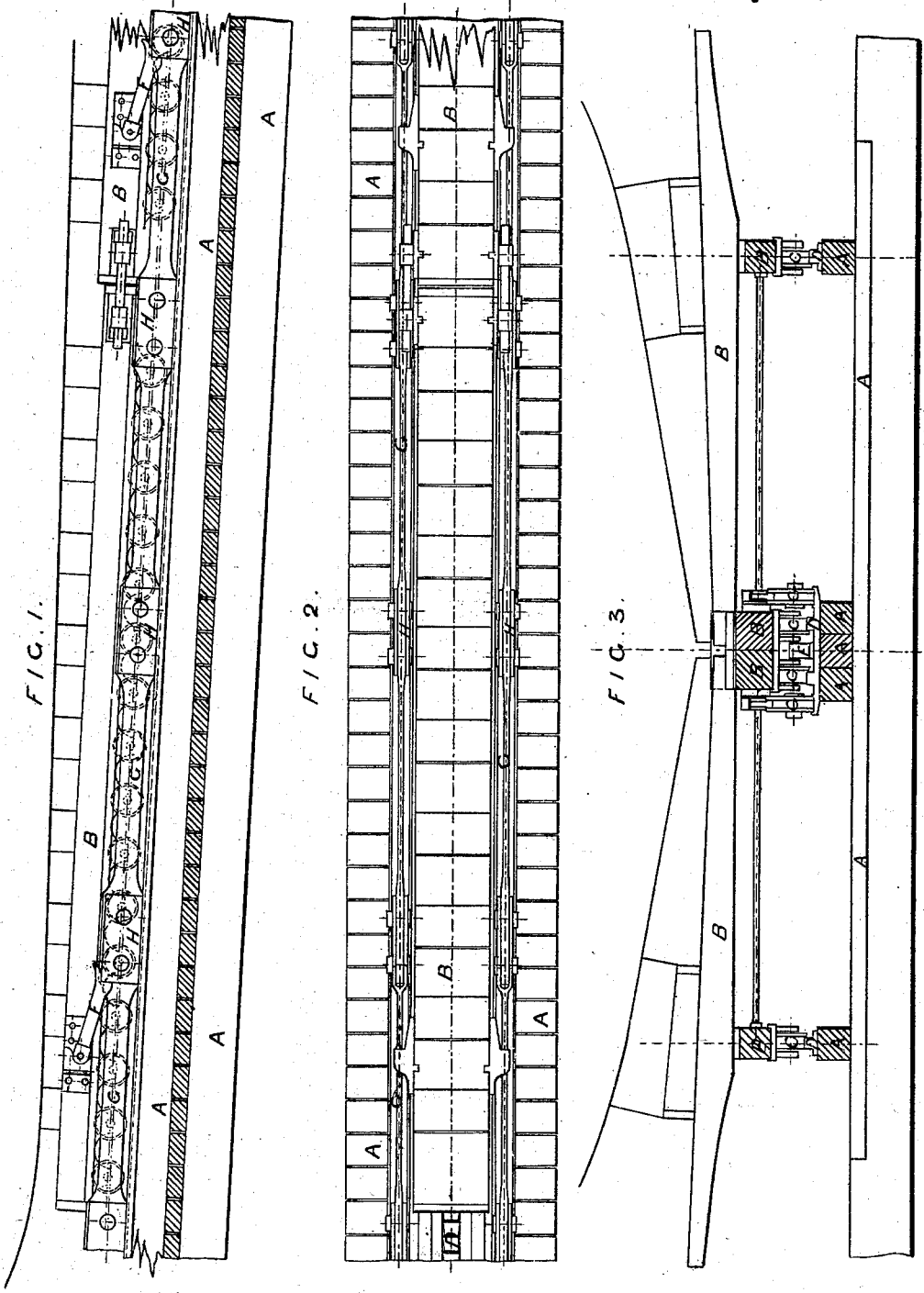

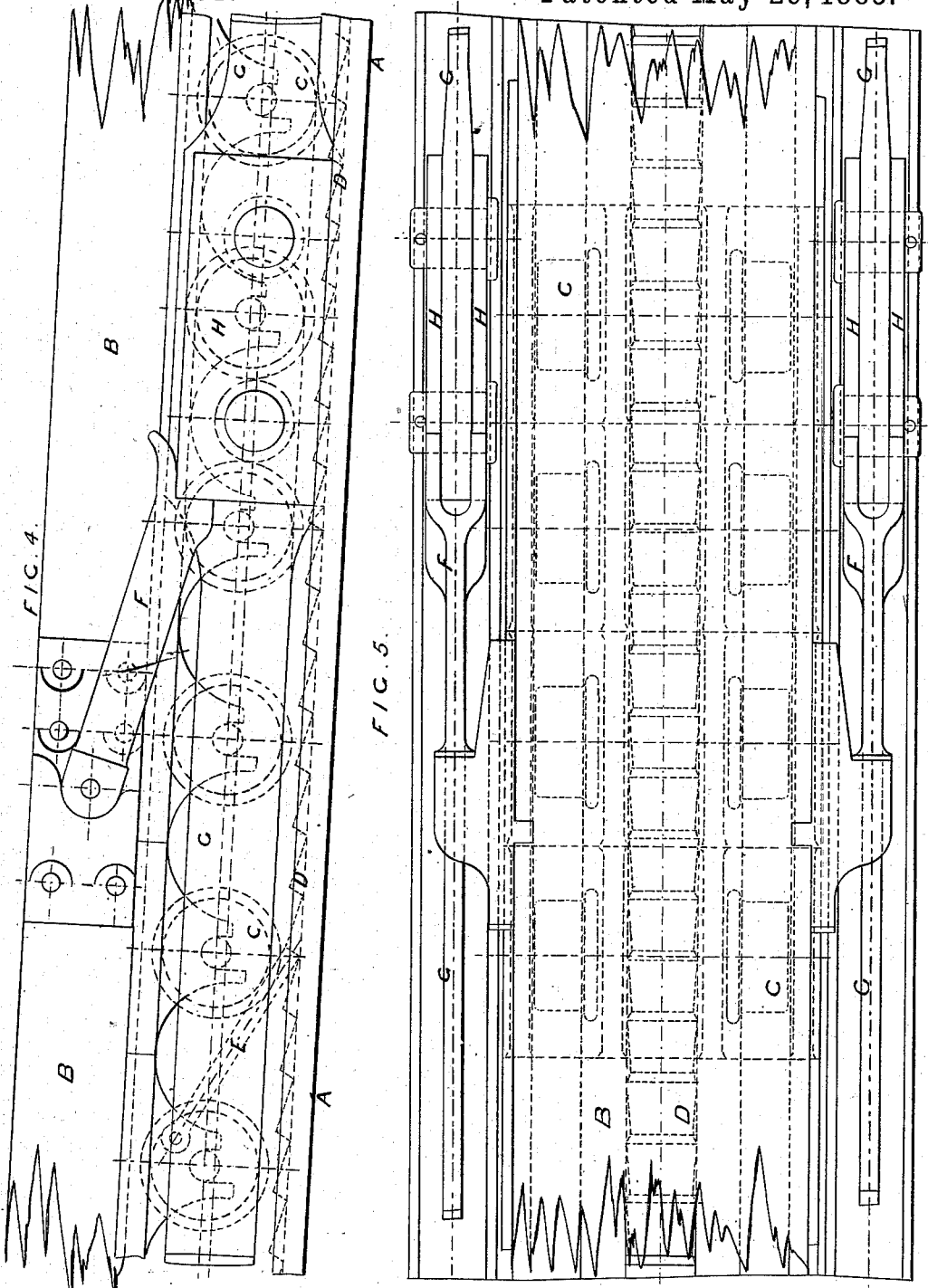

JOHN THOMPSON, OF NEWCASTLE-UPON-TYNE, COUNTY OF NORTHUMBERLAND, ENGLAND.

APPARATUS FOR HAULING UPON SLIPWAYS.

SPECIFICATION forming part of Letters Patent No. 278,631, dated May 29, 1883.

Application filed December 22, 1882. (No model.)

*To all whom it may concern:*

Be it known that I, JOHN THOMPSON, a subject of the Queen of Great Britain and Ireland, residing at Newcastle-upon-Tyne, in the county of Northumberland, Kingdom of Great Britain and Ireland, have invented new and useful Improved Apparatus for Hauling upon Slipways, of which the following is a specification.

With hauling apparatus as hitherto usually constructed for hauling ships' cradles up slipways it is necessary after each acting stroke of the hydraulic or other power apparatus or motor to uncouple or take out a bar or length of the hauling chain or chains and again couple up before the succeeding acting stroke takes place. Now, my invention is designed to obviate this serious inconvenience and loss of time, and to render the hauling process automatic and practically continuous. For this purpose I provide, in combination with the hauling bar or chain, (or bars or chains,) means whereby the said cradle is, when the said bar or chain or bars and chains is or are moving in the acting direction, automatically engaged therewith in such wise that the said cradle and its load are carried along with the said hauling bar or chain (or bars or chains) to the end of the acting stroke; also, devices, which may be such as at present employed, to prevent the return of the cradle when it is released by the hauling bars or chains during the return-stroke of the same.

An apparatus embodying my invention is shown in the accompanying drawings, whereon Sheet 1, Figure 1, is a side elevation, partly in section; Fig. 2, a plan, showing the main or center portion of slipway and cradle, without any ship or vessel; and Fig. 3 is a transverse vertical section; and on Sheet 2, Fig. 4 is a side elevation, and Fig. 5 is a plan, of a portion of the slipway, cradle, pawls, and bars or chains, shown to a larger scale.

The same letters refer to corresponding parts on all the figures.

The power apparatus, consisting of hydraulic or other cylinders, rams, and main cross-head, attached by rods to a tail cross-head, are not shown. The bars or chains for hauling up the cradle are connected to the tail cross-head. Various arrangements of hauling-cylinders may be used, as three, placed side by side, the center cylinder working separately or the two side cylinders jointly, or all working together. In some cases I employ a cylinder containing two or more concentric rams, one within the other, either of which may be worked separately, or two or more together; or, when found convenient, more than one such cylinder may be employed. The object of employing more than one cylinder or ram is to enable increased power to be applied to the cradle when heavily laden, or as an increased resistance is offered to the power by the ship or vessel being drawn out of the water.

For the purpose of overhauling the bars or chains, cross-heads, and rams quickly, so as to save time in taking a new hold, I use a small separate cylinder and arm having a constant pressure upon it, against which the main ram or rams will act during the upward or acting stroke, and which will serve, when the main outlet-valves have been opened, to force the main rams, cross-heads, and chains downward; or this cylinder may be provided with valves to bring it into action intermittently. I have not shown this cylinder on the drawings, as neither it nor the arrangement of the main hydraulic cylinders is claimed by me.

A is the main structure of the slipway; B, the cradle, constructed in sections and supported upon sheaves or rollers C C running upon rails laid upon the main structure, upon which is also fixed a rack, D, into which pawls or detents E engage in the usual manner to prevent the return of the cradle.

F F are pawls fixed in strong brackets at each side of the center timber of the cradle at suitable intervals, corresponding to multiples of the pitch of the bars forming the chains.

G G are the bars, which are united together in lengths (corresponding to the stroke of the lifting-rams) by plates H H, over the ends of which the pawls F F drop at each downward movement of the bars or chains. These plates H H and pawls F F constitute, according to this arrangement, the device for connecting the bars or chains and the cradle in the upward or acting stroke. When the bars or chains are making this stroke the plates abut against the ends of the pawls and push them and the cradle before them; but when the bars or chains are moving down the slipway the plates pass under the pawls, which rise to clear them.

The action of the apparatus is as follows: Water from the accumulator or pumping-engine being admitted to one or more of the main hauling-cylinders, (according to the weight or position of the load on the cradle,) the crosshead is driven outward by the rams, forcing the small ram into the returning-cylinder and drawing up the chains with the cradle and its load. The pressure is then cut off from the main cylinders and the water in them allowed to escape, whereupon the small returning-cylinder forces the main rams, cross-heads, and bars or chains to the lowest position ready for a new lift, the cradle being retained by the pawls D, which take into the central rack, E, and the bars or chains, with the plates H H, slipping under the pawls F F until they recommence their upward motion, when the plates H H again abut against the pawls F F and carry the cradle up the slipway.

It will be evident that the devices for automatically engaging the cradle with the hauling bars or chains, as also the motor or power apparatus employed, may be variously modified in detail without departing from the essential characteristics of my invention. Thus the pawls carried by the cradle may be made to engage in recesses formed in the hauling bars or chains (or bar or chain) instead of engaging with projections carried thereby; also, in some cases, one hauling bar or chain only may be used. In other cases more than two may be employed. Also, the power apparatus may be actuated by steam or other actuating-fluid, instead of water, as will be well understood.

What I claim is—

1. An apparatus for hauling upon a slipway, comprising a hauling bar or chain, (or bars or chains,) a cradle and means whereby said cradle is automatically engaged with said hauling bar or chain (or bars or chains) during the acting or upward stroke thereof, so as to haul the said cradle up the slipway, substantially as shown and described.

2. In an apparatus for hauling upon a slipway, the combination of a hauling bar or chain, (or bars or chains,) a cradle, means whereby such cradle is automatically engaged with said hauling bar or chain (or bars or chains) during the upward or acting stroke thereof, so as to haul said cradle up said slipway, and means for retaining said cradle in the position it has been so moved into during the return or back stroke of said bar or chain, (or bars or chains,) substantially as shown and described.

3. In an apparatus for hauling upon a slipway, the combination of hauling-chains G, with plates H, or their equivalents, power apparatus for imparting reciprocating motion to said chains, a cradle, B, and pawls F, or their equivalents, so attached to said cradle as to engage with the said plates H, or their equivalents, when said chains are moved in one direction, (so as to cause some to move said cradle with them,) and to become automatically disengaged from said plates H, or their equivalents, when said chains are moved in an opposite direction, substantially as described.

4. In an apparatus for hauling upon a slipway, the combination of hauling-chains G, with plates H, or their equivalents, power apparatus for imparting reciprocating motion to said chains, a cradle, B, pawls F, or their equivalents, so attached to said cradle as to engage with said plates H, or their equivalents, when said chains are moved in one direction, so as to cause some to move said cradle with them, and means for retaining said cradle in the position it has been so moved into during the return or back stroke of said chains, substantially as and for the purposes specified.

JOHN THOMPSON.

Witnesses:
R. W. JOHNSON,
6 *Grey Street, Newcastle-upon-Tyne.*
I. J. DAWSON,
*Consulting Engineer, Newcastle-upon-Tyne.*